United States Patent [19]

Kendall et al.

[11] 3,751,020
[45] Aug. 7, 1973

[54] SHOCK ABSORBER
[75] Inventors: Giles A. Kendall, Burbank, Calif.;
William D. Wallace, Chicago, Ill.
[73] Assignee: Miner Enterprises, Inc., Chicago, Ill.
[22] Filed: Apr. 9, 1971
[21] Appl. No.: 132,858

[52] U.S. Cl. ................................................. 267/33
[51] Int. Cl. ............................................ B60g 11/52
[58] Field of Search ........................... 188/268, 282; 267/33

[56] References Cited
UNITED STATES PATENTS
3,379,317  4/1968  Carlson ........................... 188/268 X
3,379,318  4/1968  Trongeau ........................ 188/268 X
3,206,184  9/1969  Walker ............................. 267/33 X
1,616,091  2/1927  Scott ................................ 188/282
3,036,669  5/1962  Schultze ......................... 188/282
3,407,752  10/1968 Wallace et al. ................. 188/268 X Primary Examiner—James B. Marbert
Assistant Examiner—Jerold M. Forsberg
Attorney—Edward F. Jurow and Clifford A. Dean

[57] ABSTRACT

A shock absorber having a pressure cylinder defining a chamber, in which a piston assembly connected to a piston rod is movable, and which is incompletely occupied by a compressible solid so that air space is present. The piston assembly is movable in the chamber to the extent of the air space unresisted by the compressible solid during short strokes of the piston rod, but is resisted by the compressible solid during long strokes of the piston rod.

3 Claims, 2 Drawing Figures

SHOCK ABSORBER

BACKGROUND OF THE INVENTION

1. Field of the Invention

Our present invention pertains generally to a shock absorber incorporating a compressible solid and adapted for use, for example, in association with the suspension system of a railroad car.

2. Description of the Prior Art

A shock absorber of the type to which our present invention is directed comprises a pressure cylinder defining a chamber in which a piston assembly connected to a piston rod is movable. Heretofore, the chamber has been completely occupied with a compressible solid. With this arrangement, the compressible solid offers resistance to movement of the piston assembly during all strokes, whether short or long, of the piston rod. Such prior art shock absorber is not entirely satisfactory for special applications wherein there are not only vibrations of large amplitude requiring damping but also numerous vibrations of small amplitude. Because of the high reaction force to all vibrations, in the noted special applications the shock absorber is not as operationally efficient as might be desired, and the piston rod seal is exposed to excessive wear.

SUMMARY OF THE INVENTION

Our present invention is concerned with a shock absorber of the general type described above wherein the chamber is incompletely occupied by a compressible solid so that air space is present when the piston assembly is in its normal rest position. With this innovation, while the piston assembly is resisted by the compressible solid as required during long strokes of the piston rod in response to large amplitude vibrations, the piston assembly is movable to the extent of the air space unrestricted by the compressible solid during short strokes of the piston rod in response to small amplitude vibrations. As a consequence, greater efficiency for special applications is attained, and wear of the piston rod seal is materially reduced.

The shock absorber of our present invention also incorporates a sleeve member and a coil spring exterior of the pressure cylinder which, in cooperation with the piston rod, offers a very low reaction force to small amplitude vibrations, and biases the piston assembly to its normal rest position. In additon, the piston assembly in our novel shock absorber is arranged to meter the flow of the compressible solid through the assembly for providing a high reaction force to large amplitude vibrations in the compression stroke, and yet permits rapid flow of the compressible solid through the assembly during the return stroke. Still further, the closure assembly in our novel shock absorber is so designed as to maintain the piston rod seal under a normal preliminary load, and under an operational load directly proportional to the pressure of the compressible solid during movement of the piston assembly.

By way of example, our shock absorber is adapted to be associated with the suspension system of a railroad car. More specifically, our shock absorber may be mounted vertically in parallel with the bolster springs at each side of a railway car truck. The shock absorber will offer a very low reaction force to small amplitude, high velocity vibrations occuring as the railway car body sways through small angles when the wheels pass over small bumps in the track. The shock absorber will also present a high reaction force to large amplitude, low velocity vibrations occuring whenever the car body sways or rolls through large angles. In the latter circumstance, the generation of sympathetic vibrations, and possible derailment of the car resulting therefrom, are prevented.

DESCRIPTION OF THE PREFERRED EMBODIMENT

Figure 1:
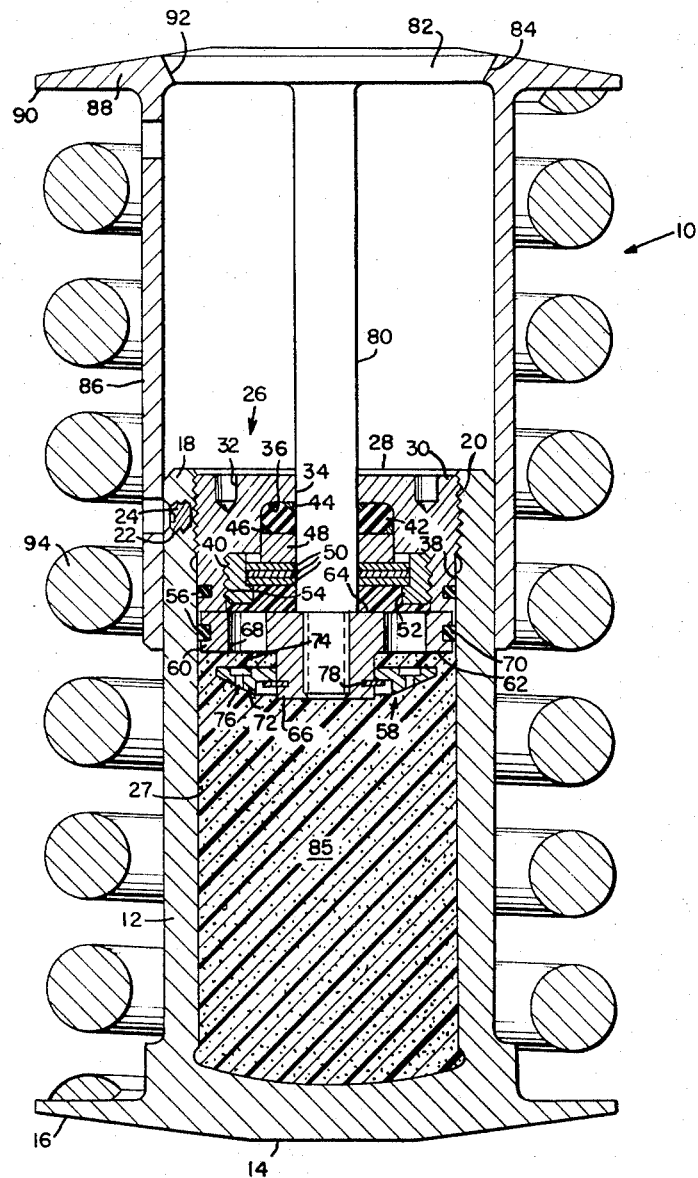
FIG. 1 is a longitudinal median sectional view of the shock absorber of our present invention, showing the components thereof in their normal rest position.

Referring now to FIG. 1, there is indicated generally by the reference numeral 10 a shock absorber incorporating the principles of our present invention.

The shock absorber 10 includes an elongated pressure cylinder or casing 12, which has a closed rearward end 14 with an outwardly directed radial flange portion 16, and which has an open forward end 18 with an inner recessed threaded wall section 20. Intersecting the threaded wall section 20 is a radial threaded aperture 22 which receives a setscrew 24.

Mounted in the forward end of the casing 12 is a closure assembly 26 which defines with the casing a chamber 27. The closure assembly 26 comprises a closure or head member 28 which is exteriorly threaded at 30 for engagement with the threaded casing section 20. The closure member 28 is formed with a pair of forwardly opening axial apertures 32, a central axial opening 34, an annular intermediate rearwardly facing recess 36, and a rearwardly extending axial sleeve portion 38 which is interiorly threaded at 40.

The closure assembly 26 further comprises a piston rod seal ring 42, inner and outer anti-extrusion rings 44 and 46, and a compression ring 48, all seated in the intermediate recess 36 of the closure member 28. Abutting the compression ring 48 is a belleville spring unit 50 held in place by a retainer ring 52 which is exteriorly threaded at 54 for engagement in the threaded sleeve portion 38 of the closure member 28. To effect a seal between the casing 12 and the closure member 28, a suitable O-ring 56 is provided. The closure assembly 26 is secured in assembled relation within the casing 12 by means of the afore-mentioned setscrew 24.

Mounted for axial movement within the chamber 27 is a piston assembly 58 which includes a piston 60 presenting a rearward side 62 and a forward side 64. The piston 60 is formed with a rearwardly extending axial hub portion 66, and with a plurality of circumferentially spaced axial openings 68. Carried by the piston 60, at its outer periphery, is a piston ring 70. Axially slidable on the piston hub 66 is an annular valve plate 72 having a forwardly facing annular channel 74 and a plurality of circumferentially spaced axial apertures 76. Rearward movement of the valve plate 72 relative to the piston hub 66 is limited by a snap ring 78.

The piston assembly 58 is suitably secured on the inner end of a piston rod 80 which extends axially through the closure assembly 26 and outwardly of the casing 12. The outer end of the piston rod 80 is formed with an enlarged head portion 82 having an annular tapered outer periphery 84. The chamber 27 is filled or charged with granules of a compressible solid or elastomer 85 such as silicone rubber, which is not placed under initial compression. By reason of the air pockets dispersed among the granules, the compressible solid itself incompletely occupies the chamber and air space is present when the piston assembly 58 is in its normal rest position shown in FIG. 1.

Mounted for axial movement on the casing 12 is a sleeve member 86. The forward end of the sleeve member 86 is formed with an enlarged head portion 88 having a radially outwardly directed flange section 90 and an annular tapered inner periphery 92 arranged to interengage the tapered outer periphery 84 of the piston rod head 82. Disposed concentrically about the casing 12 and the sleeve member 86, and extending axially between the casing flange 16 and the sleeve flange 90, is a coil spring 94. The sleeve member 86 and the coil spring 94 serve to bias the piston rod 80 to extended position and the piston assembly 58 into abutment with the closure assembly 26.

Figure 2:
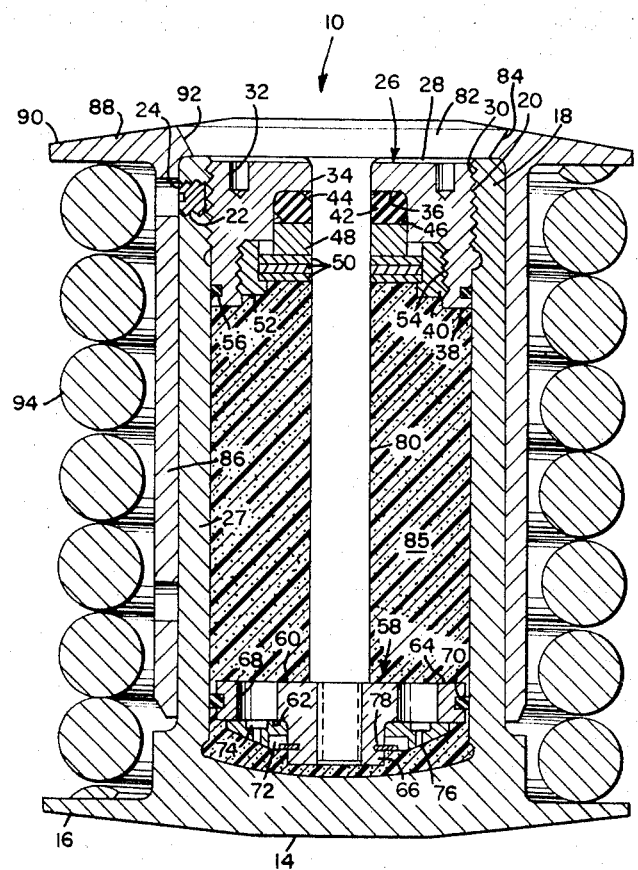
FIG. 2 is a longitudinal median sectional view corresponding generally to FIG. 1, but showing the position of the components of the shock absorber when the latter is fully compressed.

During assembly of the shock absorber 10, granules of the compressible solid 85 are introduced into the casing 12. Then, the coil spring 94 is disposed about the casing 12, and the sleeve member 86 is positioned substantially as shown in FIG. 1. Next, the coil spring 94 is compressed, and the sleeve member 86 telescoped, to the position shown in FIG. 2. At this point, the closure assembly 26, together with the piston assembly 58 and the piston rod 80, is threaded into the position shown in FIG. 1. The apertures 32 serve to receive an implement for rotating the closure assembly 26 into place. Finally, the sleeve member 86 and the coil spring 94 are released, and move to their normal rest position shown in FIG. 1.

Operationally, during short strokes of the piston rod 80 in response to vibrations or forces of small amplitude, no resistance to motion of the piston assembly 58 within the chamber 27 is offered by the compressible solid 85. The piston assembly 58 is free to move to the extent of the air space presented by the air pockets normally dispersed throughout the granular compressible solid, with only a very low reaction force being offered by the coil spring 94. As a result of this arrangement, wear of the piston rod seal 42 is minimized and the service life thereof is materially increased.

During long strokes of the piston rod 80 in response to vibrations or forces of large amplitude, resistance to motion of the piston assembly 58 within the chamber 27 is offered not only by compression of the coil spring 94 but also by the damping effect of the compressible solid 85. In this regard, as the piston assembly 58 moves rearwardly from the position shown in FIG. 1 toward the position shown in FIG. 2, granules of the compressible solid 85 initially flow through the piston openings 68 from the rearward side 62 to the forward side 64. At the same time, the piston rod 80 entering the chamber 27 serves to reduce the volume of the chamber, thus substantially eliminating the normally dispersed air pockets and increasing the pressure of the compressible solid 85 in the chamber. Concurrently, the valve plate 72 moves against the rearward side 62 of the piston 60 substantially closing the piston openings 68 while permitting granules of the compressible solid 85 to be metered through the valve plate apertures 76 which produces a throttling effect. The described volume-pressure change of the compressible solid, and the attendant throttling effect, impose a damping and spring force on the piston assembly and piston rod.

Upon dissipation or removal of the vibrations or force imposed on the piston rod 80, the coil spring 94 acting on the sleeve member 86 and the piston rod 80 serves to return the piston assembly 58 to its normal rest position shown in FIG. 1. As the piston assembly 58 moves forwardly within the chamber 27, the valve plate 72 moves away from the rearward side 62 of the piston 60 thereby permitting unrestricted and rapid flow of the granules of compressible solid 85 through the piston openings 68 from the forward side 64 to the rearward side 62 to effect a quick return stroke whereby to accommodate rapid cycling of the shock absorber. In our shock absorber 10 described above, the belleville spring unit 50 serves to maintain the piston rod seal 42 under a preliminary or initial load when the piston assembly 58 is in its normal rest position. Additionally, during movement of the piston assembly 58 within the chamber 27, the piston rod seal 42 is placed under a load directly proportional to the pressure of the compressible solid 85. This arrangement provides an effective seal at the piston rod and yet minimizes seal wear by imposing only such load as is required at any given operational stage.

While we have shown and described what we believe to be a preferred embodiment of our present invention, it will be understood by those skilled in the art that various rearrangements and modifications may be made therein without departing from the spirit and scope of our invention.

We claim:

1. A shock absorber comprising a pressure cylinder having a closed rearward end and an open forward end, a closure assembly mounted in said open end of said pressure cylinder and defining with said pressure cylinder a chamber, a piston assembly axially movable within said chamber, a piston rod connected to said piston assembly and extending through said closure assembly outwardly of said forward end of said pressure cylinder, a compressible solid incompletely occupying said chamber so that air space is present when said piston assembly is in its normal rest position, said piston assembly being movable in said chamber to the extent of the air space unresisted by said compressible solid during short strokes of said piston rod, and being movable in said chamber and resisted by said compressible solid during long strokes of said piston rod, said piston assembly comprising a piston having a rearwardly extending axial hub portion and a plurality of circumferentially spaced axial openings, an annular valve plate axially slidable on said piston hub portion and having a plurality of circumferentially spaced axial apertures, said valve plate being movable against the rearward side of said piston during rearward movement of said piston assembly in said chamber thereby substantially closing said piston openings while causing said compressible solid to be metered through said valve plate apertures, and said valve plate being movable away from the rearward side of said piston during forward movement of said piston assembly in said chamber thereby permitting said compressible solid to flow through said piston openings.

2. A shock absorber comprising a pressure cylinder having a closed rearward end and an open forward end, a closure assembly mounted in said open end of said pressure cylinder and defining with said pressure cylinder a chamber, a piston assembly axially movable within said chamber, a piston rod connected to said piston assembly and extending through said closure assembly outwardly of said forward end of said pressure cylinder, a compressible solid incompletely occupying said chamber so that air space is present when said piston assembly is in its normal rest position, said piston assembly being movable in said chamber to the extent of the air space unresisted by said compressible solid during short strokes of said piston rod, and said piston assembly being movable in said chamber and resisted by said compressible solid during long strokes of said piston rod, said closure assembly comprising a head member having a central axial opening accommodating said piston rod and an annular intermediate rearwardly facing recess and a rearwardly extending axial sleeve portion, a piston rod seal ring and a compression ring seated in said intermediate recess, a belleville spring unit mounted in said sleeve portion in abutment with said compression ring, and said piston rod seal being maintained under a preliminary load by said belleville spring unit and under an operational load directly proportional to the pressure of said compressible solid as said piston assembly moves in said chamber.

3. The shock absorber of claim 2 wherein said piston assembly comprises a piston having a rearwardly extending axial hub portion and a plurality of circumferentially spaced axial openings, an annular valve plate axially slidable on said piston hub portion and having a plurality of circumferentially spaced axial apertures, said valve plate being movable against the rearward side of said piston during rearward movement of said piston assembly in said chamber thereby substantially closing said piston openings while causing said compressible solid to be metered through said valve plate apertures, and said value plate being movable away from the rearward side of said piston during forward movement of said chamber there by permitting said compressible solid to flow through said piston openings.

* * * * *